United States Patent Office 3,793,369
Patented Feb. 19, 1974

3,793,369
PROCESS FOR PRODUCTION OF CARBOXYLIC ESTERS
Michio Hara, Kiyotaka Ohno, Jiro Tsuji, Tsunesuke Kajimoto, Shigeru Wakamatsu, and Ryoji Nakanishi, Kamakura, Japan, assignors to Toray Industries, Inc., Tokyo, Japan
No Drawing. Filed Oct. 22, 1971, Ser. No. 191,775
Int. Cl. C07c 67/00, 69/24
U.S. Cl. 260—497 A       3 Claims

ABSTRACT OF THE DISCLOSURE

Process for the production of carboxylic esters which comprises reacting an olefinically unsaturated hydrocarbon with carbon monoxide and alcohol in the presence of palladium chloride or a palladium chloride complex of an aromatic tertiary phosphine in an amount of 4–20 moles per mole palladium.

FIELD OF THE INVENTION

This invention relates to an improved process for production of carboxylic esters. Furthermore this invention relates to a process for carbonylation of olefinically unsaturated hydrocarbons in the presence of palladium catalysts.

BACKGROUND OF THE INVENTION

It has been known that the process for carbonylation of olefins can be carried out using palladium salts or palladium complexes in the presence or absence of mineral acids.

U.S. Pat. No. 3,437,676, for example, discloses that a palladium complex represented by the general formula, Lm Pd Xn, can be used as a catalyst for the carbonylation reaction of olefins to produce carboxylic esters. In this process the carboxylic esters can be obtained in good yields. However, such a process is generally not satisfactory for industrial application because of the low catalytic activity, the short catalytic life and the difficulty in reactivating the used catalyst. When a carbonylation reaction of olefins is carried out in the presence of palladium-phosphine complex, $PdCl_2(PPh_3)_2$, which is a typical palladium complex included in the above general formula, the catalyst tends to precipitate in metallic form or is converted to the inactive form during the reaction. Reactivation of the metallic palladium or inactive complexes is difficult.

Since the palladium compounds are very expensive, it is desirable that the palladium catalyst should have very high activity and long life for satisfactory industrial application. Even when the catalyst loses its activity, it should be recoverable by a simple and suitable method.

Accordingly an object of this invention is to provide a catalyst system with high activity and long catalytic life applicable to the carbonylation reaction of an olefinically unsaturated hydrocarbon. A further object of this invention is to provide a palladium catalyst system from which palladium can be recovered and reactivated easily.

SUMMARY OF THE INVENTION

According to this invention it has now been found that the addition of a large excess of aromatic tertiary phosphine to certain palladium salts or complexes remarkably improves the palladium catalyst in the catalytic activity and life in the carbonylation reaction of olefins in alcohols to give carboxylic esters.

The invention is a process for production of carboxylic esters which comprises reacting an olefinically unsaturated hydrocarbon with carbon monoxide and an alcohol in the presence of a palladium complex catalyst, said catalyst being prepared by adding to the reaction mixture a palladium compound selected from palladium chloride and palladium chloride complexes and aromatic tertiary phosphine, the total amount of said phosphine being 4 to 20 molar equivalents based on the moles of palladium present.

PREFERABLE EMBODIMENTS OF THE INVENTION

In this invention the catalyst system is comprised of palladium chloride or a complex derivative thereof and aromatic tertiary phosphine. The aromatic tertiary phosphine is represented by the following general formula

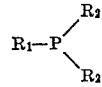

wherein $R_1$, $R_2$ and $R_3$ are the same or different aromatic radicals represented by

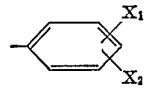

wherein $X_1$ and $X_2$ are radicals selected from the group consisting of H, $CH_3$, $C_2H_5$, phenyl, methoxy and Cl.

Triphenyl phosphine, tris(p-tolyl)phosphine, tris(p-chlorophenyl)phosphine, tris(p - ethylphenyl)phosphine, tris(p-tolyl)phosphine, diphenyl(p-tolyl)phosphine, tris(p-biphenyl)phosphine, diphenyl(p-methoxyphenyl)phosphine are examples of such aromatic tertiary phosphines.

Palladium chloride is known to react with two moles of tertiary phosphine to form a palladium complex represented as follows:

In the present invention, however, the aromatic tertiary phosphine is added to the reaction mixture in an amount more than necessary to form said palladium complex, i.e. 4 to 20, preferably 4 to 15 moles per one atom of palladium.

In the presence of such a large excess of aromatic tertiary phosphine the catalytic activity of the palladium catalyst system is highly improved in comparison with the catalyst system including only the stoichiometric amount of the phosphine.

In the process of this invention very little decomposition of the catalyst to metallic palladium occurs and both conversion and reaction yield are high.

Even if the catalyst system loses its catalytic activity, it can be easily reactivated by a very simple method and the expensive palladium catalyst thus recovered can be used effectively.

When the phosphine is added in an amount more than above the mentioned range to the reaction mixture, the rate of the reaction is lowered. Such a catalyst system containing too large an amount of phosphine is thus not practical in view of the industrial application thereof.

In this invention, palladium chloride can be added to the reaction mixture in the form of its complexes, which can be represented by a general formula, $PdCl_2(L)_n$, wherein $n$ is 1 or 2 and L is a ligand such as benzonitrile, aromatic tertiary phosphine, $PR_1R_2R_3$, such as defined above cyclooctadiene and cyclohexene etc.

As a further preferable example of the complexes of palladium chloride, there can be used a complex in which dichlorobenzene is bonded to the above palladium chloride complex as ligand and represented by the formula $[PdCl_2(L)_2]_2(C_6H_4Cl_2)$.

The amount of the catalyst is usually 0.001 to 1 mol percent as palladium metal based on the olefins to be reacted.

The olefinically unsaturated hydrocarbons to which the process of this invention is applicable, have 2 to 15 carbon atoms and 1 to 3 olefinic double bonds in their molecule. For example, ethylene, propylene, butene-1, butene-2, isobutene, hexene-1, dodecene-1, octene-1, styrene, vinylcyclohexene, cyclohexene, cyclooctene, cyclooctadiene, cyclododecatriene, cyclododecene, butadiene, isoprene can be cited. However, the process of this invention can be most preferably applied to propylene.

As the alcohol, which is another starting material of the process of this invention, aliphatic or alicyclic alcohols can be used. The alcohol must have 1 to 10 carbon atoms and may have substituent radicals so long as such substituents are not reactive under the reaction conditions of this invention. For example, methanol, ethanol, propanol, butanol, hexanol, octanol, cyclohexanol, benzyl alcohol can be cited.

Among these, methanol can be most efficiently used in this invention. It should be noted that while methanol is one of the lowest-priced alcohols, it has generally been though not to be useful in a carbonylation reaction of olefins catalyzed by palladium catalyst. This is because methanol has a comparatively strong reducing property and, for this reason, the palladium catalyst tends to be reduced to a metallic state during the reaction. According to this invention the palladium catalyst system can be used satisfactorily even in the presence of methanol, i.e. reduction of the palladium catalyst to the metallic state is substantially avoided and the carbonylation reaction can be effectively carried out. From the industrial point of view the fact that formation of metallic palladium is avoided is one of the most important features of this invention.

In a preferred embodiment of this invention, the amount of alcohol in the reaction system is limited to 10 volume percent or less throughout the reaction. If the process of this invention is carried out under such reaction conditions the precipitation of metallic palladium is substantially suppressed. Furthermore, the palladium catalyst can be easily recovered from the reaction mixture, almost quantitatively.

The concentration of alcohol is determined by the following procedure.

A part of the reaction mixture is removed from the reaction vessel at any time during the reaction period and the mixture is cooled to room temperature under atmospheric pressure. The volume of alcohol in the mixture is then determined at this condition based on the volume of the sample. The determination can be easily carried out by a conventional method such as gaschromatography.

The lowest limit of the concentration of alcohol is not critical, but it can be as small as 1 volume percent. When the alcohol concentration is less than 1 volume percent, the reaction rate becomes too small for a pracitcal industrial process.

The palladium catalyst used in this invention can be recovered as palladium chloride-phosphine complex which can be repeatedly used in the process of this invention. The complex is regenerated by introducing hydrogen chloride gas either directly into the reaction mixture or into the mixture after the reaction product has been removed therefrom by distillation. The excess of hydrogen chloride is removed by treatment with alkali or by concentration under a reduced pressure. The regenerated palladium complex can be used again in the process of this invention.

The above mentioned regeneration of the palladium catalyst is explained in detail hereunder. The reaction mixture obtained in the carbonylation reaction of this invention contains small amounts of alcohol and solvent besides carboxylic esters which are the main reaction product, and this reaction mixture also contains the palladium catalyst which usually dissolves therein.

The larger part of this mixture is preferably distilled off under reduced pressure. The distillation should be carried out at as low a temperature as possible, preferably lower than 180° C. and stopped before deposition of the palladium catalyst from the concentrated solution. To this mixture hydrogen chloride gas is introduced. The amount of the gas is not restricted but should be somewhat in excess, stoichiometrically, of that required to react with all of the palladium chloride or the complex thereof present in the reaction system. Thereafter the excess of hydrogen chloride should be removed by further concentration under reduced pressure. In some cases the concentration is carried out to dryness. The excess of hydrogen chloride can be excluded also by the treatment of the mixture with a weak base such as sodium carbonate. This neutralized mixture containing palladium chloride complex regenerated by the above treatment can be reused in the carbonylation reaction of this invention after adding thereto 2 to 15 moles of phosphine per atom of palladium.

The most preferred embodiment of this recovery procedure is to use a solvent which has a boiling point higher than that of the carboxylic esters produced and which does not dissolved hydrogen chloride. Aromatic compounds, such as anisole, chlorobenzene, dichlorobenzene, ortho-xylene, meta-xylene, para-xylene, and cumene have these characteristics and are therefore preferred for use as a solvent in the present invention.

In the case wherein no solvent is used in the carbonylation reaction of this invention, most of the carboxylic ester produced is distilled off and thereafter hydrogen chloride gas is introduced to the concentrated mixture. The mixture can be further concentrated to dryness and the resultant solid thus obtained can be reused in a carbonylation reaction as the catalyst.

Carbon monoxide used in the process of this invention is not necessarily pure and it may contain other inert gases such as carbon dioxide and nitrogen.

The process of this invention is preferably carried out under elevated pressure, usually 50 to 500 atmospheric pressure, preferably 50 to 200 atmospheric pressure, and at a temperature of 30 to 200° C., preferably 70 to 150° C.

In the process of this invention the selection of a solvent is not critical. However some solvents are preferred for practical reasons.

Benzene, toluene, xylene, chlorobenzene, dichlorobenzene and anisole, etc. typify the solvents which may be used.

The process of this invention can be put into operation either continuously or batchwise. The invention is further illustrated by the following examples.

EXAMPLE 1

A mixture of 32 g. of methanol, 0.7 g. of bis-triphenylphosphine palladium dichloride and 0.524 g. of triphenylphosphine is charged under nitrogen into a corrosion-resistant steel autoclave which has been swept out with nitrogen. The autoclave is closed and 42 g. of liquid propylene is pumped in. Then 150 kg./cm.$^2$ gauge of carbon monoxide is forced in cold and the autoclave set in agitation and heated to 130° C. for 5 hrs. From the liquid portion of the crude product, a distillate is obtained consisting of 51 g. of methyl isobutyrate and 48 g. of methyl n-butyrate. The total yield of the esters is 97.1% with reference to the charged propylene.

EXAMPLE 2

A mixture of 46 g. of ethanol, 0.7 g. of bis-triphenylphosphine palladium dichloride and 0.524 g. of triphenylphosphine is allowed to react with propylene and carbon monoxide as described in Example 1. After 5 hrs., 58 g. of ethyl isobutyrate and 54 g. of ethyl n-butyrate are obtained. The total yield of the esters is 96.6% with reference to the charged propylene.

EXAMPLE 3

96 g. of methanol, 0.42 g. of bis-triphenylphosphine palladium dichloride, 1.26 g. of triphenylphosphine and 166 g. of monochlorobenzene as a solvent are allowed to react with 126 g. of propylene and carbon monoxide (100 kg./cm.$^2$ gauge, cold) at 130° C. for 16 hrs. in 1000 ml. stainless steel autoclave. The reaction products consist of 151 g. of methyl isobutyrate and 120 g. of methyl n-butyrate.

EXAMPLE 4

The procedure of Example 3 is followed except 166 g. of toluene is used as a solvent instead of monochlorobenzene. 49 g. of methyl isotbutyrate and 46 g. of methyl n-butyrate are obtained.

EXAMPLE 5

The procedure of Example 3 is followed except 166 g. of anisole is used as a solvent instead of monochlorobenzene. 48 g. of methyl isobutyrate and 39 g. of methyl n-butyrate are obtained.

EXAMPLE 6

A mixture of 0.42 g. of bis-triphenylphosphine palladium dichloride, 1.258 g. of triphenylphosphine and 100 g. of anisole as a solvent is charged under nitrogen into a 500 ml. stainless steel autoclave which has been swept out with nitrogen. The autoclave is closed and 75.6 g. of liquid propylene is pumped in. Then 100 kg./cm.$^2$ gauge of carbon monoxide is forced in cold and the autoclave set in agitation and heated to 120° C. After the reaction temperature has increased to 120° C., methanol is pumped in and the molar ratio of methanol to palladium is kept at nearly 500 during the reaction. Carbon monoxide is charged through a pressure regulator valve to keep the reaction pressure at 150 kg./cm.$^2$ gauge. The reaction products, after 10 hrs. are 91.5 g. of methyl isobutyrate and 91.5 g. of methyl n-butyrate. The total yield of esters is practically quantitative with reference to the charged propylene.

EXAMPLE 7

The procedure of Example 6 is followed but monochlorobenzene is used instead of anisole. 102 g. of methyl isobutyrate and 81.5 g. of methyl n-butyrate are obtained. The total yield of the esters is practically quantitative with reference to the charged propylene.

EXAMPLE 8

The procedure of Example 7 is followed but 0.629 g. of triphenylphosphine is used instead of 1.258 g. of triphenylphosphine. 105 g. of methyl isobutyrate and 78.5 g. of methyl n-butyrate are obtained and the total yield of the esters is practically quantitative with reference to the charged propylene.

EXAMPLE 9

The procedure of Example 7 is followed except ethanol is used instead of methanol. 125.0 g. of ethyl isobutyrate and 79.2 g. of ethyl n-butyrate are obtained and the total yield of the esters is practically quantitative with reference to the charged propylene.

EXAMPLE 10

0.21 g. of bis-triphenylphosphine palladium dichloride, 0.629 g. of triphenylphosphine and 200 g. of monochlorobenzene as solvent are allowed to react with propylene, methanol and carbon monoxide at 120° C. for 30 hrs. as described in Example 6. 140 g. of methyl isobutyrate and 43 g. of methyl n-butyrate are obtained.

EXAMPLE 11

The procedure of Example 10 is followed but reaction pressure is kept at 50 kg./cm.$^2$ gauge instead of 150 kg./cm.$^2$ gauge. 125 g. of methyl isobutyrate and 68 g. of methyl n-butyrate are obtained.

EXAMPLE 12

A mixture of 0.21 g. of bis-triphenylphosphine palladium dichloride, 0.629 g. of triphenylphosphine and 200 g. of monochlorobenzene is charged in a 1000 ml. stainless steel autoclave which has been swept out with nitrogen. The autoclave is closed and ethylene is admitted into the autoclave until the pressure reaches 50 kg./cm.$^2$ gauge. Then 100 kg./cm.$^2$ gauge of carbon monoxide is forced in cold and the autoclave is set in agitation and heated to 120° C. After the reaction temperature has reached 120° C., methanol is pumped in keeping the molar ratio of methanol to palladium at nearly 500 during the reaction. Carbon monoxide is charged through a pressure-regulator valve and the reaction pressure is kept at 150 kg./cm.$^2$ gauge. After 30 hrs., 150 g. of methyl propionate is obtained.

EXAMPLE 13

The procedure of Example 12 is followed but 82 g. of cyclohexane is used instead of ethylene. 235 g. of methyl cyclohexane-carboxylate is obtained.

COMPARATIVE EXAMPLE 1

The procedure of Example 3 is followed except for the omission of triphenylphosphine. 50 g. of methyl isobutyrate and 36 g. of methyl n-butyrate are obtained.

EXAMPLE 14–1

A mixture of 0.93 g. (0.6 mmol) of the palladium complex, $[PdCl_2(PPh_3)_2]_2(C_6H_4Cl_2)$, 2.515 g. (9.6 mmol) of triphenylphosphine and 200 g. of o-dichlorobenzene is charged in a 1000 ml. stainless steel autoclave which has been swept out with nitrogen. The autoclave is closed and 151.2 g. (3.6 mol) of propylene is pumped in. Then 100 kg./cm.$^2$ gauge of carbon monoxide is forced in cold and the autoclave is heated to 120° C. After the reaction temperature has been raised to 120° C., methanol is pumped in keeping the molar ratio of methanol to palladium at nearly 500 during the reaction. Carbon monoxide is charged through a pressure-regulator valve and the reaction pressure is kept at 150 kg./cm.$^2$ gauge. After 10 hrs., 189 g. of methyl isobutyrate and 178 g. of methyl n-butyrate are obtained and the total yield of the esters is practically quantitative with reference to the charged propylene.

EXAMPLES 14–2

The reaction product of Example 14–1 is distilled to remove the esters formed, and into the concentrate hydrogen chloride is bubbled for a minute. After further concentration to remove the solvent, the residue containing the active catalyst is collected. This residue and 200 g. of o-dichlorobenzene are charged in the autoclave and allowed to react with propylene, methanol and carbon monoxide as described in Example 14–1. 195 g. of methyl isobutyrate and 172 g. of methyl n-butyrate are obtained and the total yield of the esters is practically quantitative with reference to the charged propylene.

EXAMPLE 14–3

The residue from Example 14–2 is obtained after hydrogen chloride treatment. This residue is used as catalyst and propylene, methanol and carbon monoxide are allowed to react as described in Example 14–2. 190 g. of methyl isobutyrate and 177 g. of methyl n-butyrate are obtained and the total yield of the esters is practically quantitative with reference to the charged propylene.

EXAMPLE 14–4

The residue from Example 14–3 is obtained after HCl treatment. This residue is used as catalyst and carbomethoxylation of propylene is carried out as described in Example 14–3. 189 g. of methyl isobutyrate and 176 g. of methyl n-butyrate are obtained.

EXAMPLE 14-5

The residue from Example 14-4, which has been treated with HCl, is allowed to react with propylene, methanol and carbon monoxide as described in Example 14-4. 100 g. of methyl isobutyrate and 90 g. of methyl n-butyrate are obtained.

EXAMPLE 14-6

The residue from Example 14-5, which has been treated with HCl, 1.258 g. (4.8 mmol) of triphenylphosphine and 200 g. of o-dichlorobenzene are allowed to react with propylene, methanol and carbon monoxide as described in Example 14-5. 146 g. of methyl isobutyrate and 114 g. of methyl n-butyrate are obtained.

EXAMPLE 14-7

The residue from Example 14-6, which has been treated with HCl, 1.258 g. (4.8 mmol) of triphenylphosphine and 200 g. of o-dichlorobenzene are allowed to react with propylene, methanol and carbon monoxide as described in Example 14-6. 189 g. of methyl isobutyrate and 178 g. of methyl n-butyrate are obtained. The procedure of Example 14-7 is repeated 20 times with no decrease of catalyst activity and methyl butyrates are obtained in practically quantitative yields with reference to the charged propylene.

EXAMPLE 15-1

The residue from a reaction similar to that described in Example 14-1, which has not been treated with HCl, is allowed to react with propylene, methanol and carbon monoxide as described in Example 14-2. 151 g. of methyl isobutyrate and 123 g. of methyl n-butyrate are obtained and the total yield of the esters is 75.6% with reference to the charged propylene.

EXAMPLE 15-2

The residue from Example 15-1, which has not been treated with HCl, is allowed to react with propylene, methanol and carbon monoxide. 35 g. of methyl isobutyrate and 18 g. of methyl n-butyrate are obtained and the total yield of the esters is 14.4% with reference to the charged propylene.

EXAMPLES 16 TO 19

Continuous reactions are carried out using a 4 liter overflow-type reactor made of stainless-steel. O-dichlorobenzene containing the complex $$[PdCl_2(PPh_3)_2]_2(C_6H_4Cl_2)$$

and triphenylphosphine, propylene, methanol and carbon monoxide are supplied to the lower end of a reaction tower and the reactants continuously overflow from the reactor to the receiver. The conditions used and the results obtained are given in the following table.

EXAMPLES 20 TO 22

The procedure of Examples 16 to 19 is followed except anisole is used as a solvent instead of o-dichlorobenzene. The conditions used and the results obtained are given in the table which follows.

TABLE

| Example | 16 | 17 | 18 | 19 | 20 | 21 | 22 |
|---|---|---|---|---|---|---|---|
| Reaction pressure, kg./cm.² | 150 | 150 | 150 | 150 | 180 | 180 | 180 |
| Reaction temperature, °C | 120 | 120 | 120 | 120 | 125 | 125 | 130 |
| [PdCl₂(PPh₃)₂]₂(C₆H₄Cl₂), mol/hr | 0.0005 | 0.0005 | 0.0005 | 0.0005 | 0.0005 | 0.0005 | 0.0005 |
| PPh₃, mol/hr | 0.008 | 0.008 | 0.008 | 0.008 | 0.008 | 0.008 | 0.008 |
| Propylene, mol/hr | 2 | 2 | 3 | 3 | 2 | 2 | 2 |
| Methanol, mol/hr | 3 | 2 | 1 | 0.5 | 2 | 1 | 0.5 |
| o-Dichlorobenzene (or anisole), mol/hr | 3 | 3 | 3 | 3 | 2.5 | 2.5 | — |
| Carbon monoxide, mol/hr | 2 | 2 | 2 | 2 | 2 | 2 | 2 |
| Concentration of methanol, vol. percent | ca. 20.6 | ca. 13.2 | ca. 5.3 | ca. 3.6 | ca. 13.0 | ca. 4.5 | ca. 2.2 |
| Conversion of methanol to esters, percent | 20 | 30 | 50 | 40 | 35 | 60 | 65 |
| Methyl isobutyrate/methyl isobutyrate plus methyl n-butyrate | 0.45 | 0.49 | 0.57 | 0.59 | 0.57 | 0.61 | 0.65 |
| Recovery ratio of palladium as [PdCl₂(PPh₃)₂]₂(C₆H₄Cl₂), percent | 38 | 59 | 96 | 80 | 62 | 97 | 80 |

What we claim is:

1. A process for the production of methyl butyrates which comprises reacting propylene with carbon monoxide and methyl alcohol in the presence of a palladium complex catalyst, and a solvent selected from the group consisting of anisole, chlorobenzene, dichlorobenzene, ortho-xylene, meta-xylene, para-xylene and cumene, said catalyst being prepared by adding to the reaction mixture a palladium compound selected from the group consisting of palladium chloride, $(PdCl_2(PR_1R_2R_3)_2)_2(C_6H_4Cl_2)$ and $PdCl_2$—$(PR_1R_2R_3)_2$, and 4 to 20 molar equivalents per palladium atom of an aromatic tertiary phosphine, namely $PR'_1R'_2R'_3$, wherein $R_1$, $R_2$, $R_3$, $R'_1$, $R'_2$, and $R'_3$, are the same or different aromatic radicals represented by the formula

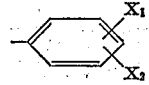

wherein $X_1$ and $X_2$ are H, $CH_3$, $C_2H_5$, phenyl or methoxy radical, the amount of said methanol being controlled to be lower than 10 volume percent on the basis of the whole reaction mixture exclusive of carbon monoxide and propylene throughout the reaction period.

2. A process as claimed in claim 1, wherein the palladium compound is $[PdCl_2(PR_1R_2R_3)_2]_2(C_6H_4Cl_2)$.

3. A process as recited in claim 1, wherein the palladium compound is $PdCl_2(PR_1R_2R_3)_2$.

References Cited
UNITED STATES PATENTS 3,455,984   7/1969   Kutepow et al. ___ 260—497 A X
3,530,155   9/1970   Fenton _____ 260—533 A X
3,641,074   2/1972   Fenton _____ 260—533 A X LORRAINE A. WEINBERGER, Primary Examiner R. D. KELLY, Assistant Examiner U.S. Cl. X.R.

260—476, R, 468 M